US008607256B2

(12) United States Patent
Kim

(10) Patent No.: US 8,607,256 B2
(45) Date of Patent: Dec. 10, 2013

(54) SPINDLE MOTOR

(75) Inventor: Yongjoo Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 73 days.

(21) Appl. No.: 13/233,526

(22) Filed: Sep. 15, 2011

(65) Prior Publication Data

US 2012/0066701 A1 Mar. 15, 2012

(30) Foreign Application Priority Data

Sep. 15, 2010 (KR) .......................... 10-2010-0090341

(51) Int. Cl.
G11B 19/20 (2006.01)

(52) U.S. Cl.
USPC .......................................................... 720/695

(58) Field of Classification Search
USPC .......................................................... 720/696
See application file for complete search history.

(56) References Cited

U.S. PATENT DOCUMENTS

| 5,698,915 | A | * | 12/1997 | Fukuyama et al. | 310/67 R |
|---|---|---|---|---|---|
| 5,965,966 | A | * | 10/1999 | Aiello et al. | 310/232 |
| 5,982,061 | A | * | 11/1999 | Grantz et al. | 310/67 R |
| 6,373,154 | B1 | * | 4/2002 | Sohn et al. | 310/51 |
| 6,734,590 | B2 | * | 5/2004 | Obara et al. | 310/90 |
| 6,931,652 | B2 | * | 8/2005 | Lee et al. | 720/696 |
| 6,965,493 | B2 | * | 11/2005 | Obara | 360/99.08 |
| 7,830,049 | B2 | * | 11/2010 | Yoneda et al. | 310/51 |
| 2001/0045782 | A1 | * | 11/2001 | Lieu et al. | 310/67 R |
| 2008/0024024 | A1 | * | 1/2008 | Tamaoka | 310/90 |
| 2009/0174272 | A1 | * | 7/2009 | Yoneda et al. | 310/156.04 |
| 2009/0206708 | A1 | * | 8/2009 | Murakami et al. | 310/425 |

* cited by examiner

Primary Examiner — Mark Blouin
(74) Attorney, Agent, or Firm — Saliwanchik, Lloyd & Eisenschenk

(57) ABSTRACT

Disclosed is a spindle motor, the spindle motor including a rotating shaft, a turntable including a body into which a through hole is formed for coupling with the rotating shaft and which supports an optical disk and rotates along with the rotating shaft, and a centering unit which is fitted over the rotating shall, moves in an axial direction of the rotating shaft, and aligns a rotating center of the optical disk with a rotating center of the rotating shaft, wherein the turntable includes a reinforcing part that protrudes from the body along a periphery of the rotating shaft.

16 Claims, 6 Drawing Sheets

SPINDLE MOTOR

CROSS-REFERENCE TO RELATED APPLICATION

This application claims the benefit under 35 U.S.C. §119 of Korean Application No. 10-2010-0090341, filed Sep. 15, 2010, which is hereby incorporated by reference in its entirety.

BACKGROUND OF THE INVENTION

1. Field of the Invention

The present invention relates to a spindle motor.

2. Description of the Related Art

Generally, an optical disk driver reads or records data from or in an optical disk. The optical disk driver includes a spindle motor that rotates the optical disk at a high speed, and an optical pickup module that stores data in a track of the optical disk rotating at a high speed and reads the data stored in the track of the optical disk.

The spindle motor includes a turntable coupled to a rotating shaft to support an optical disk and a centering unit that aligns the rotating center of the optical disk with a rotating shaft.

The turntable is press-fitted over the rotating shaft to rotate along with the rotating shaft, whereas the centering unit moves up and down in the axial direction of the rotating shaft. That is, a gap is formed between the centering unit and the rotating shaft.

The turntable is first coupled to the rotating shaft of the spindle motor. After the turntable is coupled to the rotating shaft, the centering unit is coupled to the rotating shaft.

As the turntable and the centering unit are coupled together to the rotating shaft of a limited length, a coupling area (or contact area) of the turntable with the rotating shaft is reduced, thus undesirably reducing a coupling strength of the turntable with the rotating shaft, and causing a rotational slip between the turntable and the rotating shaft.

Further, if thickness of the turntable increases so as to increase the coupling area of the rotating shall with the turntable, the overall size of the spindle motor undesirably increases.

BRIEF SUMMARY

Accordingly, an object of the present invention is to provide a spindle motor, which improves a coupling strength of a turntable with a rotating shaft without an increase of volume or thickness.

In order to accomplish the above object, the present invention provides a spindle motor comprising: a rotating shaft; a turntable including a body into which a through hole is formed for coupling with the rotating shaft, the body supporting an optical disk and rotating along with the rotating shaft; and a centering unit fitted over the rotating shaft, moving in an axial direction of the rotating shaft, and aligning a rotating center of the optical disk with a rotating center of the rotating shaft, wherein the turntable comprises a reinforcing part that protrudes from the body along a periphery of the rotating shaft.

Preferably, the reinforcing part protrudes from an upper surface of a bottom plate of the body of the turntable that faces the centering unit.

Preferably, the reinforcing part is shaped such that thickness thereof is continuously increased in a direction from the periphery of the rotating shaft to an outer circumference of the rotating shaft.

Preferably, the reinforcing part has a ring shape, when viewed on a plane.

Preferably, the reinforcing part has a triangular shape or a rectangular shape, when viewed on a cross-section.

Preferably, a receiving part is provided in a bottom plate of the centering unit that faces the turntable, the receiving part being shaped like a recess to receive the reinforcing part.

Preferably, a total thickness of the body of the turntable and the reinforcing part brought into contact with the outer circumference of the rotating shaft is equal to or greater than a thickness of a portion of the bottom plate in which the receiving part is formed.

The spindle motor according to another embodiment of the present invention further comprises a base plate; a stator including a bearing housing coupled to the base plate, a bearing inserted into the bearing housing and rotatably supporting the rotating shaft, a core coupled to an outer circumference of the bearing housing, and a coil wound around the core; and a rotor including a yoke that has a burring part coupled to the rotating shaft and rotates along with the turntable, and a magnet that is attached to an inner surface of the yoke and faces the core.

Preferably, an interval between the centering unit and the turntable with respect to the rotating shaft is equal to or greater than length of the burring part.

Preferably, thickness of the turntable is equal to or greater than thickness of the centering unit with respect to the rotating shaft.

When viewed on a plane, a plurality of reinforcing parts is formed intermittently.

As apparent from the above description, the spindle motor according to the present invention is advantageous in that a reinforcing part is provided on a turntable which is press-fitted over a rotating shaft, thus improving a contact area of the rotating shaft with the turntable, preventing a rotational slip between the rotating shaft and the turntable, and preventing the turntable from being placed obliquely relative to the rotating shaft, therefore preventing a data read error or a data write error while data is recorded in or read from an optical disk.

DETAILED DESCRIPTION

Figure 1:
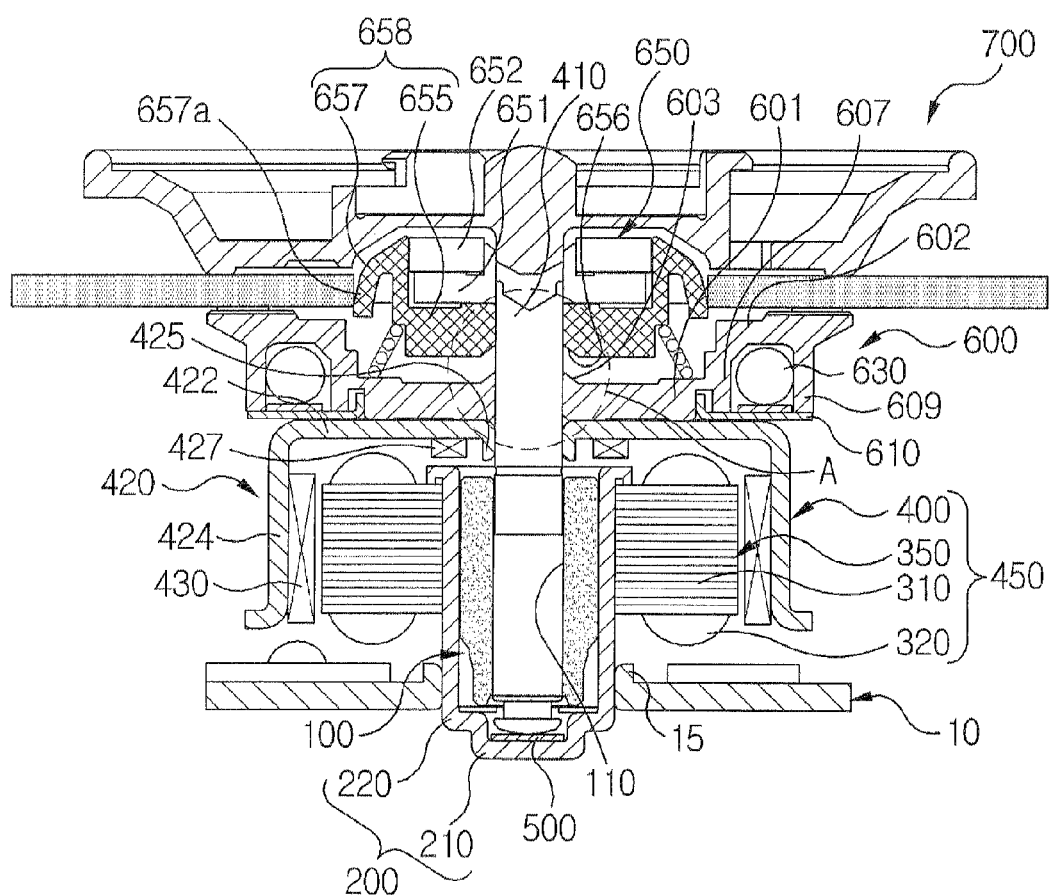
FIG. 1 is a sectional view showing a spindle motor in accordance with an exemplary embodiment of the present invention.

Hereinafter, exemplary embodiments of the present invention will be described in detail with reference to the accompanying drawings. For clarity and convenience of description, the size or shape of components shown in the drawings may not be illustrated to scale. Further, terminologies defined in consideration of the construction and effect of the present invention may be changed according to a user or operator intention or the custom. These terminologies should be interpreted as having meanings and concepts in keeping with the technical spirit of the present invention based on the overall detailed description.

Figure 2:
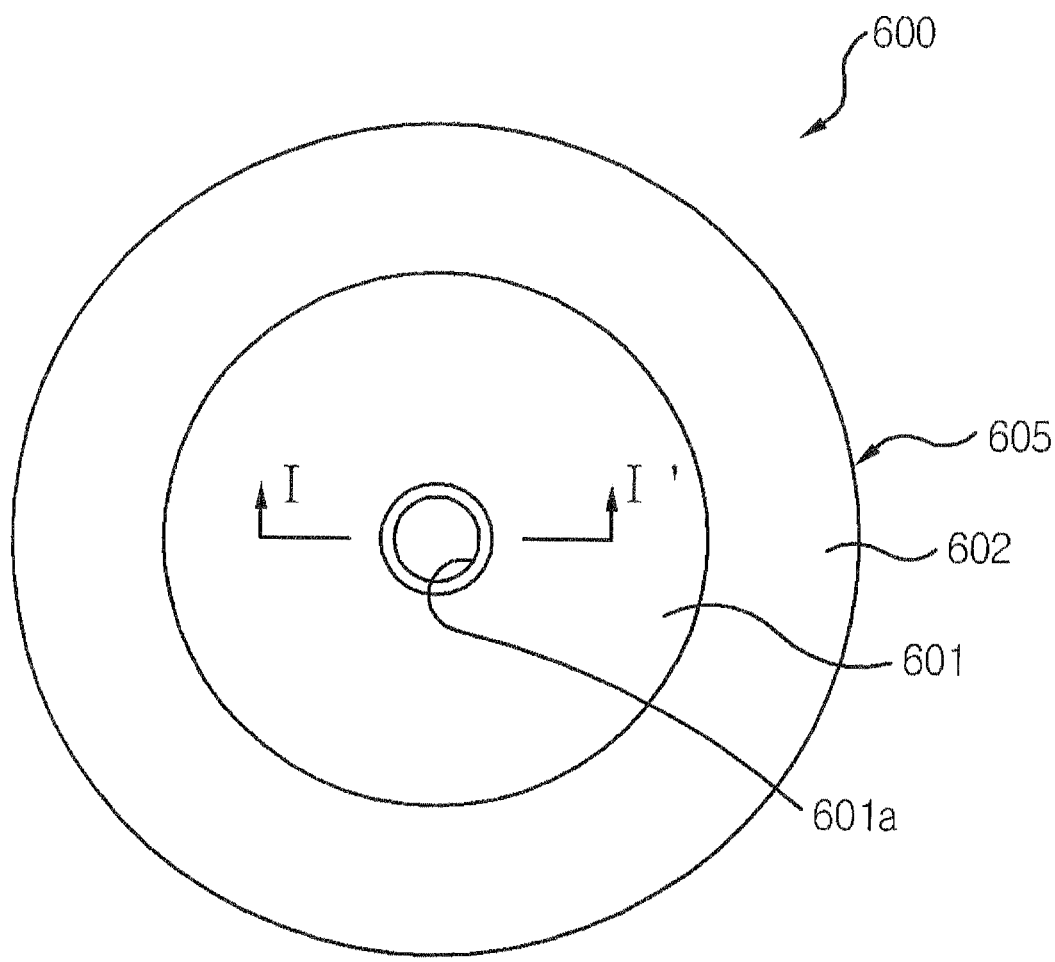
FIG. 2 is a plan view showing a turntable of FIG. 1.
Figure 3:
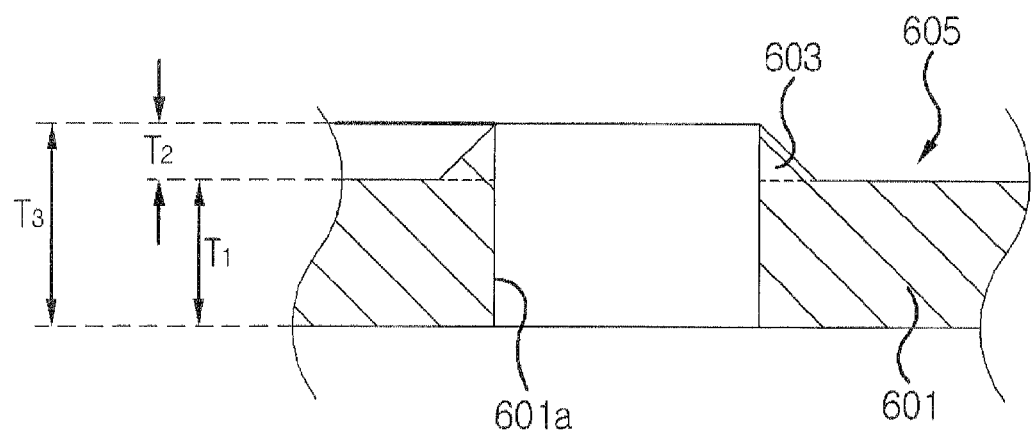
FIG. 3 is a sectional view taken along line I-I' of FIG. 2.
Figure 4:
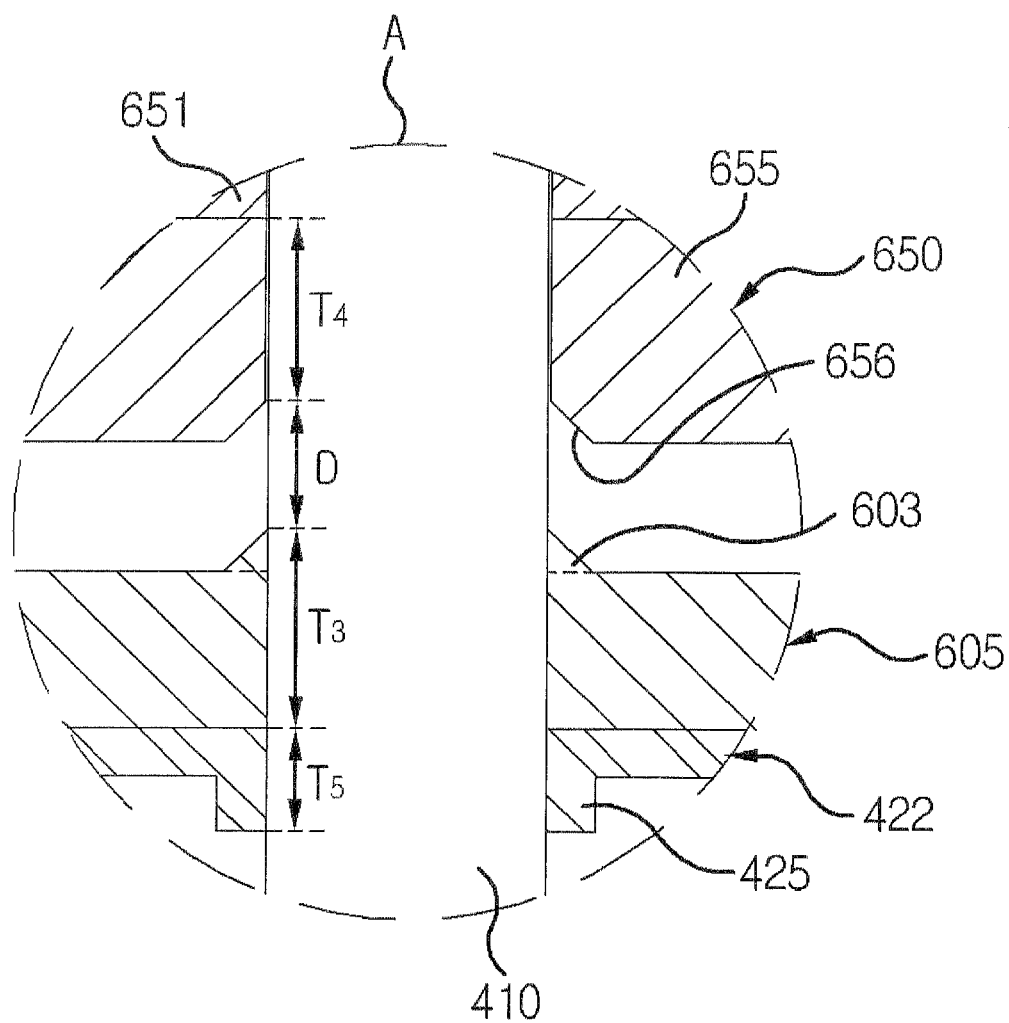
FIG. 4 is an enlarged view showing portion 'A' of FIG. 1.

FIG. 1 is a sectional view showing a spindle motor in accordance with an exemplary embodiment of the present invention. FIG. 2 is a plan view showing a turntable of FIG. 1. FIG. 3 is a sectional view taken along line I-I' of FIG. 2. FIG. 4 is an enlarged view showing portion 'A' of FIG. 1.

Referring to FIGS. 1 to 4, a spindle motor 700 includes a spindle motor unit 450 having a rotating shaft 410, a turntable 600 and a centering unit 650.

The spindle motor unit 450 includes a base plate 10, a stator 350 and a rotor 400.

The base plate 10 is assembled with the stator 350 that will be described below in detail. A burring part 15 with a burring hole is formed through a central portion of the base plate 10.

The stator 350 includes a bearing 100, a bearing housing 200, a core 310 and a coil 320.

The bearing 100 has the shape of a cylinder in which a shaft hole 110 is formed. The bearing 100 may comprise an oil impregnated sintered bearing for rotating the rotor 400, which will be described below in detail, at a high speed.

The bearing housing 200 is shaped like a container that is open at a top thereof, and includes a bottom plate 210 and a sidewall 220.

The bottom plate 210 of the bearing housing 200 is formed, for example, to have the shape of a disc, with a thrust bearing 500 being placed on an upper surface of the bottom plate 210. The thrust bearing 500 functions to prevent the rotating shaft 410 of the rotor 400, which will be described below in detail, from being worn out.

The sidewall 220 of the bearing housing 200 is used to receive the bearing 100, and extends from an edge of the bottom plate 210 along an outer surface of the bearing 100.

According to the embodiment of the present invention, the sidewall 220 is formed, for example, to have a cylindrical shape, and the bearing 100 is inserted into the sidewall 220. The bearing 100 may be press-fitted into the bearing housing 200.

The core 310 is constructed by staking up a plurality of steel sheets each having an opening. An opening is formed through a central portion of the core 310, so that the core 310 is press-fitted over an outer circumference of the bearing housing 200 using the opening.

The coil 320 is wound around the core 310 via a winding part (not shown) that is provided on the core 310. As current is applied to the coil 320 wound around the core 310, a magnetic field is generated from the coil 320.

The rotor 400 includes a rotating shaft 410, a yoke 420 and a magnet 430.

The rotating shaft 410 is rotatably inserted into the shaft hole 110 of the bearing 100. A lower end of the rotating shaft 410 is machined, for example, to have a curved surface. The rotating shaft 410 is in point contact with the thrust bearing 500 that is placed on the bottom plate 210 of the bearing housing 200.

The yoke 420 includes a disc-shaped top plate 422 and a skirt part 424 that is bent from the top plate 422 in such a way as to face an end of the core 310. A yoke burring part 425 is provided on a central portion of the top plate 422, so that the yoke burring part 425 is inserted through an upper end of the rotating shaft 410 in such a way as to be press-fitted over the rotating shaft 410.

A suction magnet 427 is placed on a flange part of the bearing housing 200 that faces an inner surface of the top plate 422. By the suction magnet 427, attractive force is applied to the top plate 422. This prevents the top plate 422 from levitating.

The magnet 430 is placed along an inner surface of the skirt part 424, and the rotor 400 is rotated relative to the stator 300 by attractive force or repulsive force between a magnetic field generated from the magnet 430 and a magnetic field generated from the coil 320 wound around the core 310.

Referring to FIGS. 1 to 3, the turntable 600 is placed on the top plate 422 of the yoke 420, and the turntable 600 is coupled to the rotating shaft 410. In the embodiment of the present invention, the turntable 600 is press-fitted over the outer circumference of the rotating shaft 410. Such a construction causes the turntable 600 to rotate along with the rotating shaft 410.

The turntable 600 includes a body 605, an inner rim 607, an outer rim 609, a cover member 610 and a ball 630.

The body 605 of the turntable 600 includes a bottom plate 601 and a side plate 602. The bottom plate 601 is shaped like a disc, while the side plate 602 protrudes in a ring shape from an edge of the bottom plate 601. The bottom plate 601 and the side plate 602 define a concave receiving part in the body 605 of the turntable 600.

At the central portion of the bottom plate 601 of the body 605 is formed a through hole 601a, which penetrates an upper surface of the bottom plate 601 and the lower surface opposite to the upper surface. A diameter of the through hole 601a is slightly larger than that of the rotating shaft 410, so that the rotating shaft 410 is press-fitted into the bottom plate 601 of the body 605.

By press-fitting the body 605 of the turntable 600 over the rotating shaft 410, the turntable 600 is rotated along with the rotating shaft 410.

The inner and outer rims 607 and 609 of the turntable 600 are, for example, formed on the lower surface that is opposite to the upper surface of the body 605. The inner and outer rims 607 and 609 are arranged to be concentric with the through hole 601a of the body 605.

When viewed on a plane, the inner rim 607 provided on the body 605 is formed to have the shape of a circular fence with a first diameter and a predetermined height. Further, when viewed on the plane, the outer rim 609 provided on the body 605 is formed to have the shape of a circular fence with a predetermined height and a second diameter that is larger than the first diameter.

The inner and outer rims 607 and 609 are spaced apart from each other by a predetermined interval, and are arranged such that they face each other.

When viewed on the plane, the inner and outer rims 607 and 609 form an annular trench serving as a receiving space therebetween. Balls 630 are received in the annular trench. According to the embodiment of the present invention, for example, 3 to 10 balls 630 are provided in the annular trench.

The balls 630 are rotated along the trench between the inner and outer rims 607 and 609. The balls 630 are arranged at a position opposite to an eccentric part of the rotating body 605, thus compensating for the eccentricity caused by the turntable 600 and a disk mounted on the turntable 600.

The cover member 610 covers the inner rim 607 and the outer rim 609, and prevents the balls 630 received in the trench between the inner and outer rims 607 and 609 from being removed from the body 605 of the turntable 600 that rotates at a high speed. When viewed on a plane, the cover member 610 may be formed to have a donut shape that covers the inner rim 607 and the outer rim 609.

An annular felt with a predetermined frictional force is paced on the inner surface of the cover member 610.

Turing back to FIG. 1, the centering unit 650 includes a centering unit body 658, a back yoke 651 and a magnet 652.

The centering unit body 658 is fitted over the rotating shaft 410. The centering unit body 658 fitted over the rotating shaft 410 is placed on the turntable 600.

The centering unit body 658 includes a bottom plate 655 and a side plate 657. The bottom plate 655 is shaped like a disc. At the central portion of the bottom plate 655 is formed a through hole that penetrates the bottom plate 655. A diameter of the through hole is larger than that of the rotating shaft 410, so that the centering unit body 658 moves up and down in the axial direction of the rotating shaft 410.

The side plate 657 extends upwards from an upper edge of the bottom plate 655, and a centering piece 657a is formed on the side plate 657. The centering piece 657a extends downwards from the upper surface of the side plate 657. The centering piece 657a presses an inner surface formed by a through hole of an optical disk so that the rotating center of the optical disk is aligned with that of the rotating shaft 410.

The bottom plate 655 and the side plate 657 of the centering unit body 658 form a receiving space in the centering unit body 658.

The back yoke 651 is placed in the receiving space of the centering unit body 658. The back yoke 651 is placed on the bottom plate 655 of the centering unit body 658. The back yoke 651 includes a through hole that communicates with the through hole formed in the bottom plate 655. The through hole of the back yoke 651 is formed to have a diameter that is larger than that of the rotating shaft 410.

The magnet 652 is placed on the back yoke 651. The magnet 652 is held by the back yoke 651.

According to the embodiment of the present invention, the turntable 600 and the centering unit 650 are sequentially coupled to the rotating shaft 410 of the spindle motor 700. Since the centering unit 650 causes a reduction in contact area between the turntable 600 and the rotating shaft 410, the turntable 600 may be rotated or tilted relative to the rotating shaft 410.

FIG. 4 is an enlarged view showing portion 'A' of FIG. 1.

Referring to FIGS. 1 to 4, in order to further increase the contact area between the rotating shaft 410 and the turntable 600, a reinforcing part 603 may be provided on the body 605 of the turntable 600.

The reinforcing part 603 increases the contact area between the body 605 of the turntable 600 and the rotating shaft 410, thus preventing the turntable 600 from being rotated or tilted relative to the rotating shaft 410.

According to the embodiment of the present invention, the reinforcing part 603 protrudes, for example, from the upper surface of the body 605 of the turntable 600 that faces the centering unit 650.

The reinforcing part 603 protrudes from the body 605 making contact with the rotating shaft 410 along the outer circumference of the rotating shaft 410. When viewed on a plane, the reinforcing part 603 may be formed into a ring shape, as shown in FIG. 2. Further, when viewed on a cross-section, the reinforcing part 603 may be formed to have the shape of a right-angled triangle, a vertical side of which is in contact with the rotating shaft 410, as shown in FIG. 3. That is, the reinforcing part 603 may be formed such that it has a ring shape having slope, and its thickness of section gradually increases from upper part to lower part.

As shown in FIG. 3, the body 605 of the turntable 600 is formed with a first thickness T1, and the reinforcing part 603 is formed with a second thickness T2.

The bottom plate 601 is formed with a thickness T3 that is equal to the sum of the first thickness T1 of the body 605 and the second thickness T2 of the reinforcing part 603. Therefore, the contact area between the turntable 600 and the rotating shaft 410 increases, thus preventing the rotational slip of the turntable 600 and the rotating shaft 410 or preventing the turntable 600 from tilting relative to the rotating shaft 410.

Figure 5:
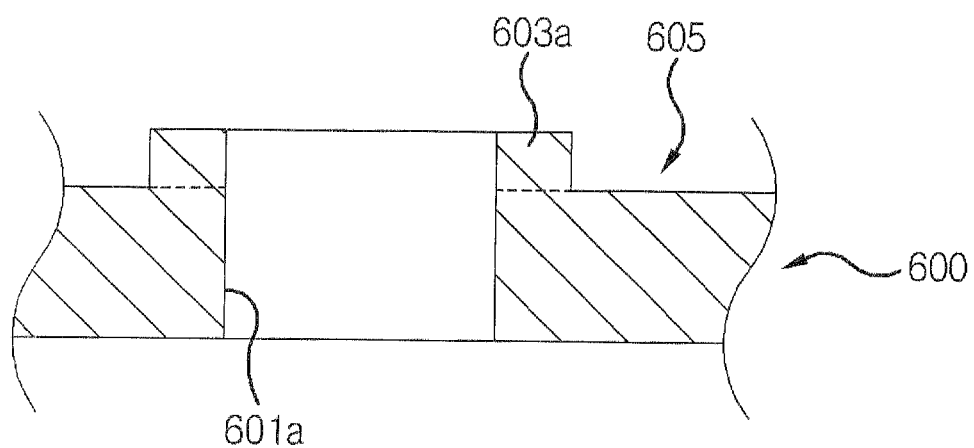
FIG. 5 is a sectional view showing a reinforcing part provided on a turntable of a spindle motor in accordance with another exemplary embodiment of the present invention.

FIG. 5 is a sectional view showing a reinforcing part provided on a turntable of a spindle motor in accordance with another exemplary embodiment of the present invention.

Referring to FIG. 5, when viewed on a plane, a reinforcing part 603a is formed to have the shape of a ring surrounding the outer circumference of the rotating shaft 410. When viewed on a cross-section, the reinforcing part 603a is formed to have a rectangular shape. Unlike the shape, the reinforcing part 603a may be formed to have various cross-sections, including a quadrantal cross-section and a pentagonal cross-section.

Referring to FIGS. 1 to 3, when the reinforcing part 603 protrudes from the upper surface of the body 605 of the turntable 600, an interval between the centering unit body 658 of the centering unit 650 and the turntable 600 is reduced by the reinforcing part 603, so that the vertical movement of the centering unit 650 may be affected by the reinforcing part 603.

Further, when the centering unit 650 moves up and down, the centering unit 650 is tilted by the reinforcing part 603, so that the precise coupling of the optical disk is hindered.

As such, in order to prevent the turntable 600 having the reinforcing part 603 from interfering with the centering unit 650, a receiving part 656 is formed in the lower surface of the bottom plate 655 of the centering unit 650 that faces the body 605 of the turntable 600, as shown in FIGS. 1 and 4.

The receiving part 656 is formed to be concave in a direction from the lower surface of the bottom plate 655 of the centering unit 650 to the upper surface of the bottom plate 655. For example, the receiving part 656 is formed to have a shape corresponding to that of the reinforcing part 603 that is provided on the turntable 600.

For example, as shown in FIG. 4, when the reinforcing part 603 is formed to have a triangular cross-section, the receiving part 656 is also formed to have a triangular cross-section corresponding to that of the reinforcing part 603. Unlike this, if the reinforcing part 603a has a rectangular cross-section as shown in FIG. 5, the receiving part 656 has a rectangular cross-section to correspond to that of the reinforcing part 603a.

According to the embodiment of the present invention, as shown in FIG. 4, length T3 along which the reinforcing part 603 and the body 605 of the turntable 600 make contact with the rotating shaft 410 is equal to or greater than thickness T4 of the bottom plate 655 of the centering unit 650 in which the receiving part 656 is formed.

Further, according to the embodiment of the present invention, an interval D between the outer circumference of the rotating shaft 410 making contact with the reinforcing part 603 provided on the body 605 of the turntable 600 and the receiving part 656 formed in the bottom plate 655 of the centering unit 650 is longer than the length of the yoke burring part 425 press-fitted over the rotating shaft 410.

Figure 6:
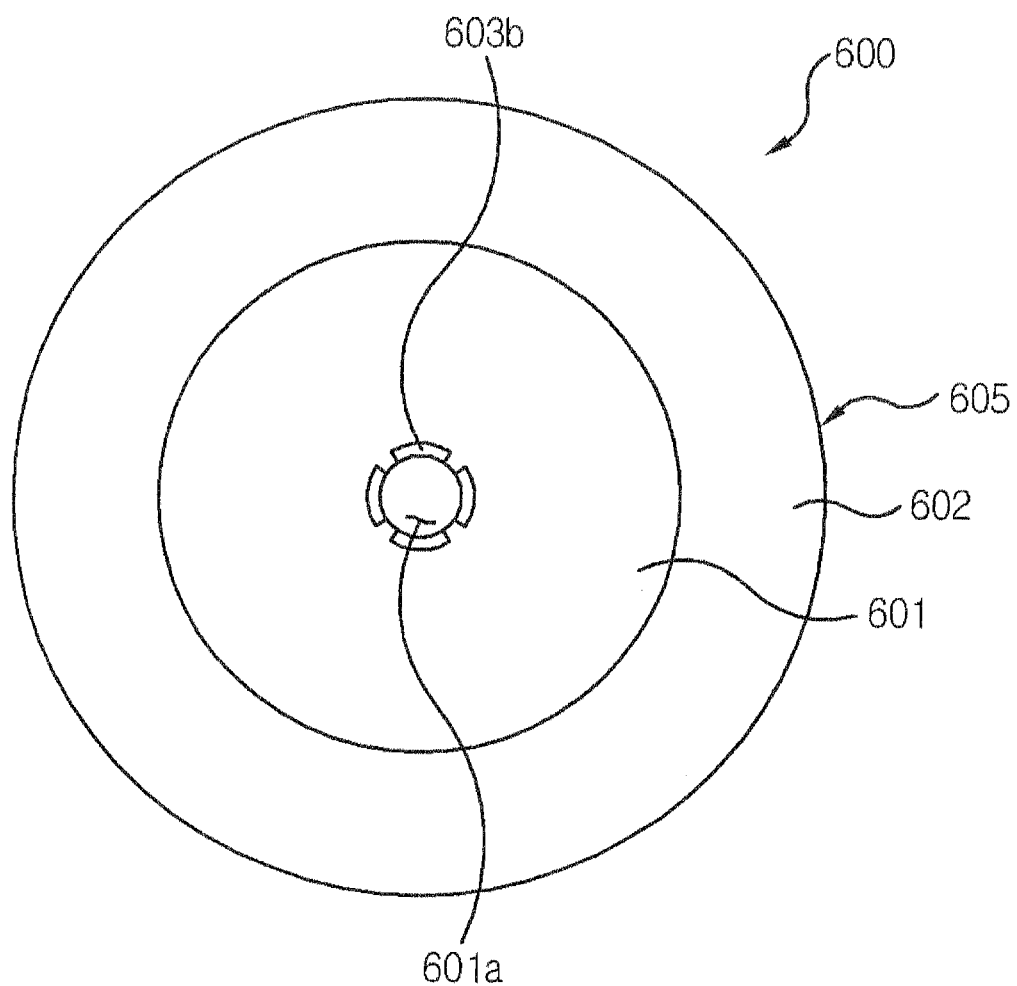
FIG. 6 is a plan view showing a turntable applied to a spindle motor in accordance with a further exemplary embodiment of the present invention.

FIG. 6 is a plan view showing a turntable applied to a spindle motor in accordance with a further exemplary embodiment of the present invention. The general construction of the turntable shown in FIG. 6 remains the same as the turntable shown in FIG. 2, except for the reinforcing part. Therefore, duplicated description of the same construction will be omitted, and the same component will carry the same reference numeral.

Referring to FIG. 6, the turntable 600 includes a body 605 and reinforcing parts 603b, the body 605 being composed of a bottom plate 601 through which a through hole 601a is formed and a side plate 602.

The reinforcing parts 603b according to the embodiment of the present invention are formed around the through hole 601a that is formed through the bottom plate 601 of the body 605. At least two reinforcing parts 603b protrude from the upper surface of the bottom plate 601. The reinforcing parts 603b make contact with the outer circumference of the rotating shaft 410 to enhance a coupling strength of the rotating shaft 410 with the turntable 600.

As described above, the present invention provides a spindle motor, in which a reinforcing part is provided on a turntable press-fitted over a rotating shaft, thus improving a contact area of the rotating shaft with the turntable, preventing a rotational slip between the rotating shaft and the turntable, and preventing the turntable from being placed obliquely relative to the rotating shaft, therefore preventing a data read error or a data write error while data is recorded in or read from an optical disk.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spindle motor, comprising:
   a base plate;
   a bearing housing coupled to the base plate;
   a rotating shaft connected to the bearing housing;
   a rotor coupled to the rotating shaft;
   a stator mounted on an outer surface of the bearing housing to rotate the rotor;
   a turntable including a body into which a through hole is formed for coupling with the rotating shaft, the body supporting an optical disk and rotating along with the rotating shaft; and
   a centering unit fitted over the rotating shaft, moving in an axial direction of the rotating shaft, and aligning a rotating center of the optical disk with a rotating center of the rotating shaft;
   wherein the turntable comprises a reinforcing part that protrudes from the body along a periphery of the rotating shaft;
   wherein the bearing housing includes a bearing to rotate the rotor;
   wherein the stator includes a core coupled to an outer circumference of the bearing housing, and a coil wound around the core; and
   wherein the rotor includes a yoke having a burring part coupled to the rotating shaft, and a magnet attached to an inner surface of the yoke where the magnet faces the core.

2. The spindle motor as set forth in claim 1, wherein the reinforcing part protrudes from an upper surface of a bottom plate of the body of the turntable that faces the centering unit.

3. The spindle motor as set forth in claim 2, wherein the reinforcing part is shaped such that thickness thereof is continuously increased in a direction from the periphery of the rotating shaft to an outer circumference of the rotating shaft.

4. The spindle motor as set forth in claim 1, wherein the reinforcing part has a ring shape, when viewed on a plane.

5. The spindle motor as set forth in claim 4, wherein the reinforcing part has a triangular shape or a rectangular shape, when viewed on a cross-section.

6. The spindle motor as set forth in claim 1, wherein a receiving part is provided in a bottom plate of the centering unit that faces the turntable, the receiving part being shaped like a recess to receive the reinforcing part.

7. The spindle motor as set forth in claim 6, wherein a total thickness of the body of the turntable and the reinforcing part brought into contact with the outer circumference of the rotating shaft is equal to or greater than a thickness of a portion of the bottom plate in which the receiving part is formed.

8. The spindle motor as set forth in claim 1, wherein an interval between the centering unit and the turntable with respect to the rotating shaft is equal to or greater than length of the burring part.

9. The spindle motor as set forth in claim 8, wherein thickness of the turntable is equal to or greater than thickness of the centering unit with respect to the rotating shaft.

10. A spindle motor, comprising:
    a base plate;
    a bearing housing coupled to the base plate;
    a rotating shaft connected to the bearing housing;
    a rotor coupled to the rotating shaft;
    a stator mounted on an outer surface of the bearing housing to rotate the rotor;
    a turntable including a body into which a through hole is formed for coupling with the rotating shaft, the body supporting an optical disk and rotating along with the rotating shaft; and
    a centering unit fitted over the rotating shaft, moving in an axial direction of the rotating shaft, and aligning a rotating center of the optical disk with a rotating center of the rotating shaft;
    wherein the turntable comprises a plurality of reinforcing parts that protrudes from the body along a periphery of the rotating shaft and are intermittently formed when viewed on a plane;
    wherein the bearing housing includes a bearing to rotate the rotor;
    wherein the stator includes a core coupled to an outer circumference of the bearing housing, and a coil wound around the core; and
    wherein the rotor includes a yoke having a burring part coupled to the rotating shaft, and a magnet attached to an inner surface of the yoke where the magnet faces the core.

11. The spindle motor as set forth in claim 10, wherein the plurality of reinforcing parts protrudes from an upper surface of a bottom plate of the body of the turntable that faces the centering unit.

12. The spindle motor as set forth in claim 11, wherein the plurality of reinforcing parts is shaped such that thickness thereof is continuously increased in a direction from the periphery of the rotating shaft to an outer circumference of the rotating shaft.

13. The spindle motor as set forth in claim 10, wherein the plurality of reinforcing parts has a ring shape, when viewed on a plane.

14. The spindle motor as set forth in claim 13, wherein each of the reinforcing parts has a triangular shape or a rectangular shape, when viewed on a cross-section.

15. The spindle motor as set forth in claim 10, wherein a receiving part is provided in a bottom plate of the centering unit that faces the turntable, the receiving part being shaped like a recess to receive the plurality of reinforcing parts.

16. The spindle motor as set forth in claim 15, wherein a total thickness of the body of the turntable and the plurality of reinforcing parts brought into contact with the outer circumference of the rotating shaft is equal to or greater than thickness of a portion of the bottom plate in which the receiving part is formed.

* * * * *